June 18, 1940.  Q. GRAHAM  2,205,252
INDUCTION-MOTOR BRAKING
Filed Oct. 21, 1938
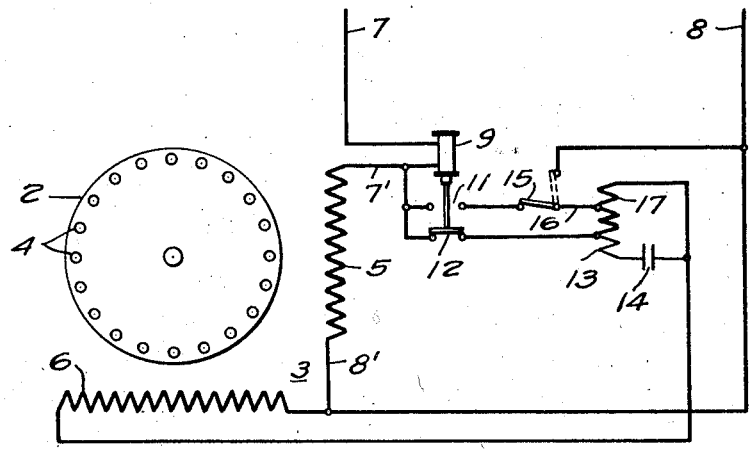
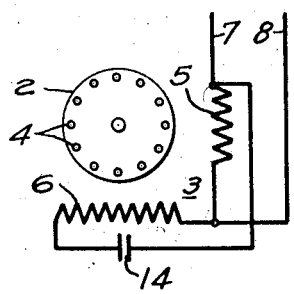
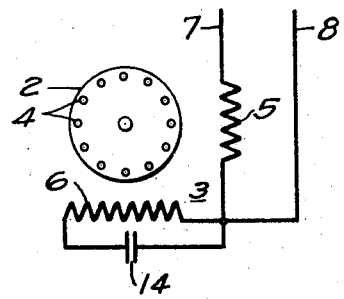
WITNESSES:
INVENTOR
Quentin Graham.
BY
ATTORNEY Patented June 18, 1940

2,205,252

UNITED STATES PATENT OFFICE 2,205,252

INDUCTION-MOTOR BRAKING

Quentin Graham, Oakmont, Pa., assignor to Westinghouse Electric & Manufacturing Company, East Pittsburgh, Pa., a corporation of Pennsylvania Application October 21, 1938, Serial No. 236,186

4 Claims. (Cl. 172—279)

My invention relates to improved methods and apparatus for braking inductor motors, and in particular, single-phase capacitor-motors.

An object of my invention is to provide a simple electrical braking system which is a satisfactory substitute for direct-current braking for induction motors, thereby avoiding the complications and expense of having to provide rectifiers or other sources of direct current for the braking-operation.

In a sense, my invention is an improvement in the braking system disclosed in an article by Gewecke, in Siemens-Zietschrift, September, 1929, page 565, relating to the braking of a three-phase, wound-rotor induction motor by a single-phase energization of the primary windings, whereby the line-current from one of the line-conductors passed through one of the phases of the Y-connected primary windings, and then divided, at the Y-point, and passed through the two remaining phases, the terminals of which were connected together to complete the circuit to the other line-conductor.

With the foregoing and other objects in view, my invention consists in the apparatus, combinations, systems and methods hereinafter described and claimed, and illustrated in the accompanying drawing, wherein:

Figure 1 is a diagrammatic view of circuits and apparatus embodying my invention in an exemplary form, and Figs. 2 and 3 are schematic views illustrating respectively the motoring and braking connections of the motor.

My invention is illustrated in connection with a single-phase induction motor having a rotor member 2 and a stator member 3. The rotor member 2 carries secondary windings 4 in the shape of a squirrel-cage winding or other closed-circuited secondary windings, which would have to have a moderately high resistance, in order to develop satisfactory braking torques during the braking operation of the motor. In a certain class of induction motors, particularly in small-size motors, the squirrel-cage winding is normally of a moderately high resistance, in order to develop the necessary starting-torque in the motor. The stator member 3, as illustrated carries a two-phase primary winding consisting of a main winding 5 and an auxiliary winding 6, usually of a larger number of turns, displaced spatially by preferably 90 electrical degrees with respect to the main winding 5.

The illustrated motor is one which both starts and runs as a capacitor motor, and in which the value of the capacitance is changed between the starting and running conditions, in a manner which is well known. Referring to Fig. 1, it will be seen that the supply-leads 7 and 8 of a single-phase source are connected, respectively, to the terminals 7' and 8' of the main winding 5, in series with the operation coil 9 of an under-current relay having front-contacts 11 which are made when the relay is strongly energized, and back contacts 12 which are made when the relay-current drops below a predetermined value. The auxiliarly winding 6 is connected between the supply-lead 8 and the main-winding terminal 7' through an auto-transformer 13 and either one of the relay-contacts 11 or 12, depending upon the position of the relay. The auto-transformer 13 is utilized as a current transformer for stepping up the voltage which is impressed upon a capacitor 14, which is thus connected in series-circuit relation to the auxiliary winding 6.

The motoring operation of the motor just described is as follows. When a single-phase voltage is applied to the supply-leads 7 and 8, there is an initial in-rush of current which is sufficient to instantly pick up the under-current relay 9 and close its top relay-contacts 11, thereby energizing the auxiliary winding in series with the capacitor 14 with the maximum possible voltage impressed upon the capacitor, so that the effective capacitance of the capacitor is the greatest. At some convenient speed of the motor, as it comes up toward full-speed operation, the current drawn by the motor reduces to such a value that the under-current relay 9 drops out, opening the contacts 11 and closing the back-contacts 12, thereby increasing the number of primary turns on the auto-transformer 13, and decreasing the effective capacitance of the capacitor 14. By utilizing the two values of the serially connected capacitance, it is possible to obtain a reasonably high starting-torque, while still maintaining desirable full-speed running conditions. The serially connected capacitor 14, in series-circuit relation to the auxiliary winding 6, causes the current in the auxiliary winding 6 to be displaced in time-phase with reference to the current in the main winding 5, thereby producing the effect of polyphase energization of the primary windings of the motor, and producing a rotating torque for both starting and running conditions.

In accordance with my invention, I provide a braking means, for motors of this general type, as symbolized in Fig. 1 by a two-position switch 15, which is connected in series with the starting-tap 16 of the auto-transformer, so as to disconnect this tap from the relay-contact 11 and to connect it to the supply-lead 8 when the switch 15 is moved from its illustrated full-line position to its dotted-line position. This causes a sufficient current in-rush to pick up the under-current relay 9, opening its back-contact 12 and close-circuiting the auxiliary winding 6 upon itself in series-circuit relation with a small part 17 of the auto-transformer 13, so that the maximum voltage is applied to the capacitor 14, thus utilizing the capacitor in its maximum capacitance-effect.

While I have illustrated a very simple or elementary form of change-over switching-means 15, for changing from running to braking conditions, it will be obvious that more elaborate means may be utilized, and possibly normally would be utilized, in the actual practice of my invention, except in the most inexpensive installations. I wish the change-over switch 15 to be regarded as simply illustrative of the broad principles of the invention, and not as in any sense limiting the invention to the particular form of switch shown.

The essential effect of the change-over switch 15 will perhaps best be understood by reference to Figs. 2 and 3. In Fig. 2, I illustrate the essential motoring-conditions, in which it will be seen that the main winding 5 is connected across the supply-leads 7 and 8, while the auxiliary winding 6 is connected in series-circuit relation with the capacitor 14, in another circuit which is connected in parallel to the main winding 5 and across the supply-leads 7 and 8. Fig. 3 shows the essential braking connections, in which only the main winding 5 is energized from the supply-leads 7 and 8, whereas the auxiliary winding 6 is closed-circuited on itself in series-circuit relation with the capacitor 14.

During braking conditions, the effective capacitive impedance of the capacitor 14 should preferably be equal and opposite to the effective inductive impedance of the auxiliary winding 6, so as to produce a closed circuit, of the lowest possible impedance, for the auxiliary winding 6.

The essential requirements, for effective braking of the motor, as I analyze the invention, are that one of the primary windings, such as the winding 5, shall be energized from the single-phase source, and that the other primary winding, such as the winding 6, shall be short-circuited on itself so as to operate as the best possible damping-means for preventing the forwardly rotating component of the magnetic flux from being materially larger than the backwardly rotating component thereof. To make this possible, it is necessary for the short circuited primary winding 6 to have a greater effectiveness, in controlling the relative magnitudes of the forwardly and backwardly rotating flux-components, than the squirrel-cage winding 4, which means that the resultant impedance of the short-circuited winding 6 must be relatively low, whereas the resultant impedance of the squirrel-cage winding 4, or other closed-circuited secondary winding, must be relatively high, because the well-known effect of the squirrel-cage winding is to tend to selectively damp out the backwardly rotating flux-component, depending upon the amount of slip and the resistance or impedance of the squirrel-cage winding.

Tests and theory have both proven that my invention provides a very effective braking means for induction motors.

While I have illustrated my invention in a single illustrative form of embodiment, it will be obvious that many changes may be made by those skilled in the art without departing from the essential spirit of the invention. I desire, therefore, that the appended claims shall be accorded the broadest construction consistent with their language and the prior art.

I claim as my invention:

1. An induction motor having a primary member and a secondary member, said primary member comprising means for providing, in effect, a main winding-portion and a spatially displaced auxiliary winding-portion, said secondary member comprising closed-circuited secondary windings; in combination with a pair of single-phase supply-leads; means for causing said motor to be self-started and operated with said primary winding-portions energized from said pair of single-phase supply-leads; starting means including means for, in effect, connecting a relatively large capacitor in series-circuit relation to said auxiliary winding portion, whereby the current in said auxiliary winding-portion is displaced in time-phase with respect to the current in the main winding-portion; running means including means for, in effect, connecting a relatively small capacitor in series-circuit relation to said auxiliary winding-portion; and braking means including means for causing said main winding-portion to be energized from said pair of single-phase supply-leads, and means for, in effect, connecting a relatively large capacitor in series-circuit relation in a closed circuit around said auxiliary winding-portion.

2. An electric motor having a main primary winding-means, an auxiliary-winding circuit comprising a spatially displaced auxiliary primary winding-means and a serially connected auto-transformer connected in series with each other and in shunt across said main winding-means, a capacitor energized from said auto-transformer, a tap-changing device for said auto-transformer, a start-run controlling means for changing the taps of the auto-transformer so as to have different settings for motor-starting and running, respectively, and braking means for disconnecting said auxiliary-winding circuit from said main winding-means and closed-circuiting it on itself, with the taps of the auto-transformer in their motor-starting setting.

3. A self-starting single-phase motor having a main primary winding-means, a spatially displaced auxiliary primary winding-means and a squirrel-cage secondary member of moderately high resistance, in combination with a pair of single-phase supply-leads, means for causing said motor to be started with both of said primary winding-means so energized, from said pair of single-phase supply-leads, that the currents in the two primary winding-means are displaced in time-phase from each other, and braking means comprising means for causing said main primary winding-means to be energized from said pair of single-phase supply-leads and closed-circuiting means for said auxiliary primary winding-means, said closed-circuiting means being of sufficiently low total impedance to cause the closed-circuited auxiliary winding-means to damp down the forwardly rotating flux-component to a value lower than the value to which the secondary member damps the backwardly rotating flux, whereby a braking torque is provided.

4. A self-starting single-phase induction motor having a primary member and a secondary member, said primary member having a main winding-means and a spatially displaced auxiliary winding-means, said secondary member comprising closed-circuited secondary windings, in combination with a pair of single-phase supply-leads, operating-means for causing said motor to be started with said main and auxiliary primary winding-means energized from said pair of single-phase supply-leads, said operating-means including a capacitor connected in series-circuit relation to said auxiliary primary winding-means, and braking-means including means for causing said main primary winding-means to be energized from said pair of single-phase supply-leads, and closed-circuiting means for said auxiliary primary winding-means, said closed-circuiting means comprising a capacitor of such relatively low impedance as to cause said auxiliary winding-means to damp down the forwardly rotating flux-component to a value lower than the value to which the secondary member damps the backwardly rotating flux, whereby a braking torque is provided.

QUENTIN GRAHAM.